United States Patent [19]
Hoppe

[11] Patent Number: 5,905,423
[45] Date of Patent: May 18, 1999

[54] MAGNETICALLY RETAINED POLYMERIC SOLENOID TIP

[75] Inventor: Jeffrey C. Hoppe, Unionville, Mich.

[73] Assignee: Walbro Corporation, Cass City, Mich.

[21] Appl. No.: 08/991,020

[22] Filed: Dec. 15, 1997

[51] Int. Cl.[6] .................................................. H01F 7/00
[52] U.S. Cl. .......................... 335/230; 335/229; 335/253; 335/255; 251/129.15; 251/129.16; 251/129.21
[58] Field of Search .................................. 335/229–234, 335/253, 255; 251/129.15, 129.16, 129.21, 65; 239/88–92, 584, 585.1, 585.3, 585.4; 29/607

[56] References Cited

U.S. PATENT DOCUMENTS

| | | | |
|---|---|---|---|
| 3,738,578 | 6/1973 | Farrell | 239/585 |
| 4,524,797 | 6/1985 | Lungu | 137/343 |
| 4,564,046 | 1/1986 | Lungu | 137/265.65 |
| 4,690,371 | 9/1987 | Bosley et al. | 251/65 |
| 4,737,750 | 4/1988 | Prouty | 335/177 |
| 5,024,247 | 6/1991 | Lembke | 137/82 |
| 5,188,336 | 2/1993 | Graner et al. | 251/129.16 |
| 5,611,312 | 3/1997 | Swanson et al. | 123/436 |

*Primary Examiner*—Michael L. Gellner
*Assistant Examiner*—Tuyen T. Nguyen
*Attorney, Agent, or Firm*—Barnes, Kisselle, Raisch, Choate, Whittemore & Hulbert, P.C.

[57] ABSTRACT

A permanent magnet armature solenoid has a tip formed of a non-magnetic material operably connected to a ferromagnetic insert which is firmly held to the end of the magnetic armature by the magnetic attraction between the insert and armature. The magnetic field of the armature holds the armature and the insert together as a single unit, even under high acceleration, deceleration and rapid movement of the armature. The insert is relatively small compared to the armature and the addition of the insert to the solenoid does not significantly adversely affect the performance of the solenoid. The insert is preferably formed of a magnetically susceptible metal such as iron, steel or stainless steel. Desirably, the tip is formed of a polymeric material and preferably of an elastomer so that the tip may be molded directly to the insert by conventional molding techniques to facilitate molding the non-magnetic tip onto the insert.

20 Claims, 2 Drawing Sheets

MAGNETICALLY RETAINED POLYMERIC SOLENOID TIP

FIELD OF THE INVENTION

This invention relates generally to solenoids and more particularly to an improved construction of a permanent magnet armature solenoid.

BACKGROUND OF THE INVENTION

Permanent magnet armature solenoids are well known and commercially available. Such solenoids may be used to control the air and/or fuel flow within a fuel system. With control provided by an electronic circuit, the solenoid can open and close passages carrying fuel or air to control the fuel and air mixture flow inside a diaphragm carburetor as disclosed in U.S. Pat. No. 5,611,312, the disclosure of which is incorporated herein by reference.

A solenoid elastomer tip deformable against a seat to close a passage may be molded directly to the end of the magnetic armature to ensure a sufficient seal of the passage when the solenoid is in its closed position and also to absorb the impact energy when the tip of the solenoid initially engages the seat. Conventional molding techniques require a relatively high die clamping force to mold the elastomeric tip onto the armature and this high force can deform or even fracture the brittle magnetic material of the armature. A reduction in the die clamping force results in excessive flash being formed adjacent to the elastomeric tip which requires an extra manufacturing step, which is usually performed manually, to remove the excess flash. This additional step is labor intensive and time consuming and hence, costly.

Another disadvantage of a permanent magnet armature solenoid is the limited reach, or extent to which the armature may project out of the solenoid coils. In a permanent magnet armature solenoid, there is a very close relationship between the given coil configuration and the volume of magnetic material in the armature such that if a significant portion of the armature extends beyond the coils of the solenoid, the performance of the solenoid is degraded.

SUMMARY OF THE INVENTION

A permanent magnet armature solenoid has a separate elastic tip attached to an insert of high magnetic permeability which is firmly held on the end of the armature by the magnetic attraction between the insert and armature. The magnetic field of the armature holds the armature and the insert together as a single unit, even under rapid acceleration and deceleration movement of the armature. The insert is relatively small compared to the armature and the addition of the insert to the solenoid does not significantly adversely affect the performance of the solenoid. The insert is preferably formed of ferromagnetic metal such as iron, nickel, cobalt, steel or stainless steel. Desirably, the tip is formed of a polymeric material and preferably of an elastomer so that the tip may be molded directly to the insert by conventional molding techniques to facilitate molding the tip onto the insert.

In one embodiment the insert is a generally flat, circular disk having a pair of flat faces with one face adapted to engage the armature and the other face adapted to receive the tip thereon. In a second embodiment the insert has a generally cylindrical sidewall around which the tip is received. Preferably, to increase the surface area of engagement between the insert of the second embodiment and the armature, this insert has a radially extending flange providing a generally flat face adjacent one end and adapted to engage the armature. The insert sidewall extends away from the armature spacing the free end of the tip from the armature so that the solenoid may be used to control the flow through a passage spaced from the coils of the solenoid.

Objects, features and advantages of this invention include providing a permanent magnet armature solenoid with an elastic tip which can be produced by conventional molding techniques, does not deform or fracture the material of the armature, enables the tip to be extended sufficiently away from the coil of the solenoid, is reliable, durable, of relatively simple design and economical manufacture and assembly and in service has a long, useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
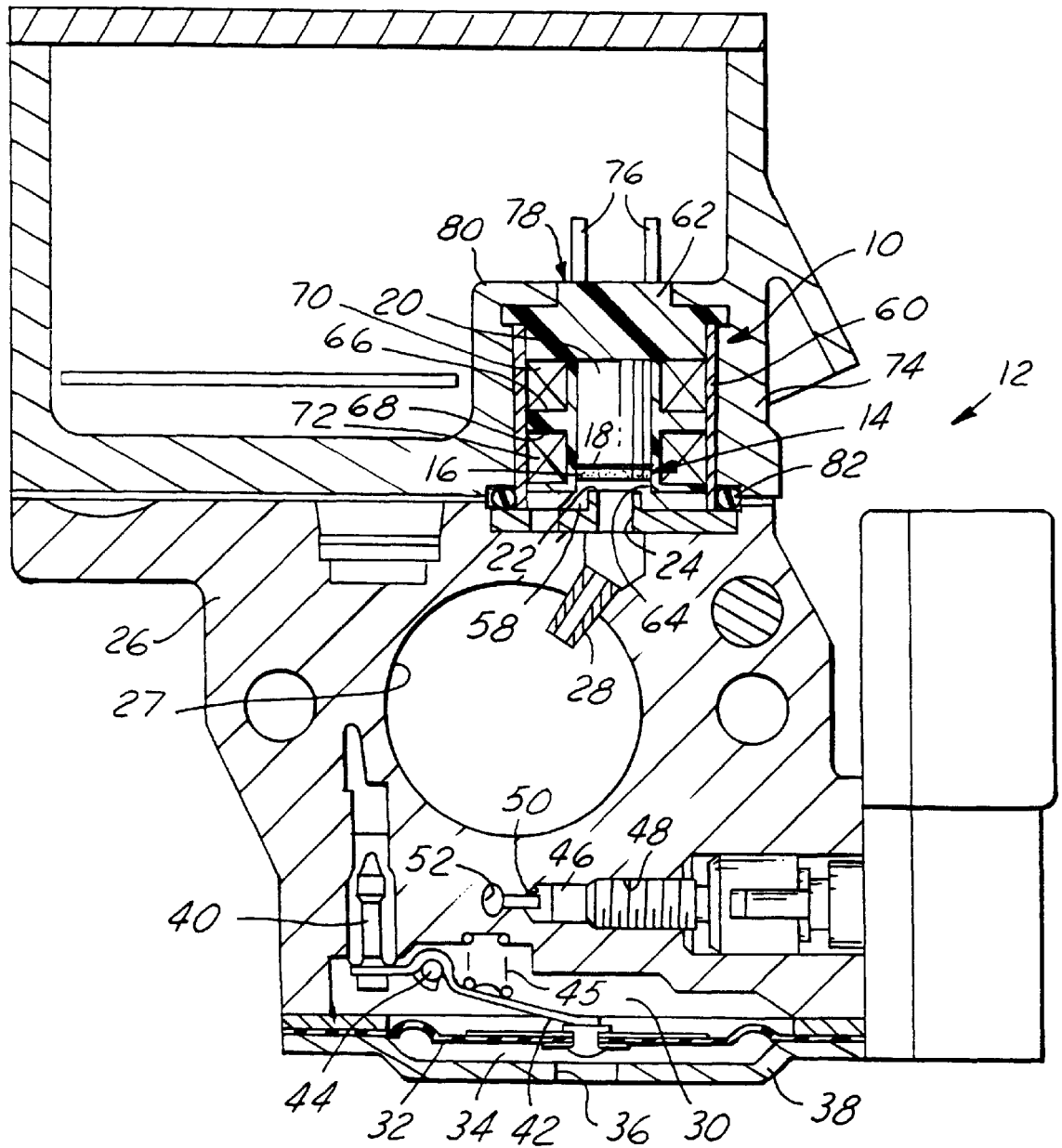
FIG. 1 is a cross sectional view of a diaphragm carburetor having a permanent magnet armature solenoid therein embodying the invention.
Figure 2:
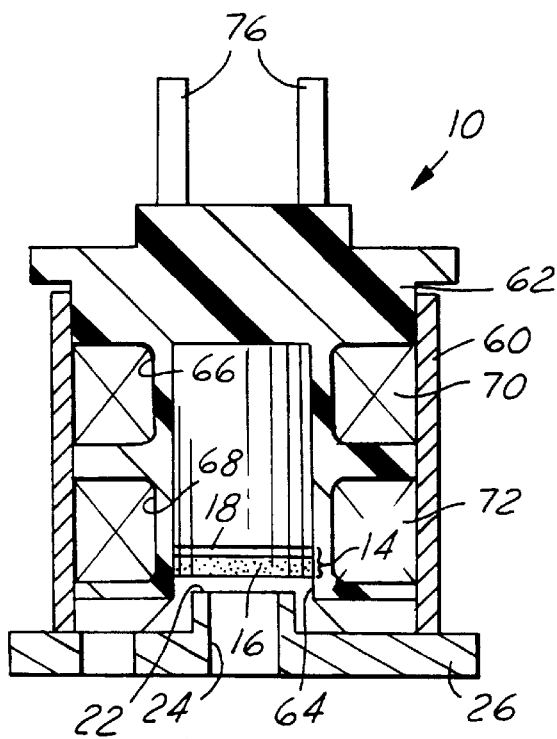
FIG. 2 is a cross-sectional view of a permanent magnet armature solenoid embodying the invention in an open position.
Figure 3:
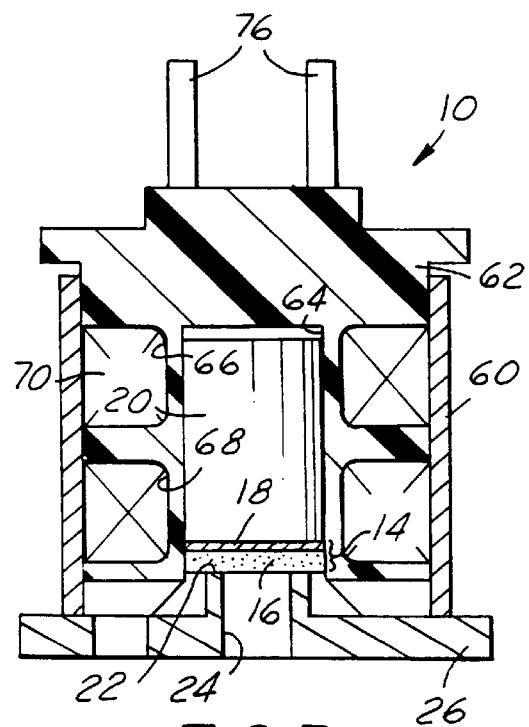
FIG. 3 is a sectional view of the solenoid of FIG. 2 in a closed position.

Referring in more detail to the drawings, FIG. 1 illustrates a permanent magnet armature solenoid 10 used to control the air and fuel mixture within a diaphragm carburetor 12. The solenoid 10 has a solenoid tip subassembly 14 having a non-magnetic tip 16 operably connected to a ferromagnetic disk 18 which is held on an armature 20 by the magnetic attraction between the armature 20 and the disk 18. The non-magnetic tip 16 is preferably formed of an elastomeric material injection molded onto or otherwise permanently attached to the disk 18 and is deformable against a seat 22 encircling a passage 24 adjacent the solenoid 10 to ensure a fluid tight seal when the tip 16 bears on the seat 22 to control fluid flow through the passage 24.

The carburetor 12 has a body 26 with a venturi passage 27 receiving a conventional throttle valve (not shown) which is moveable from its closed, normal idle position to a wide open throttle position by rotating the throttle valve so that it is disposed substantially parallel to the direction of the fluid flow therethrough. Fuel is supplied to a main metering nozzle 28 from a metering chamber 30 formed in the bottom of the carburetor body 26. The upper face of a diaphragm 32 communicates with the metering chamber 30 and its opposite face with an air chamber 34 in turn communicating with the atmosphere via an opening 36 in a diaphragm chamber cover plate 38. An inlet valve 40 is operably connected to the diaphragm 32 by a lever arm 42 pivoted on a pin 44 and biased by a spring 45. The quantity of fuel supplied to the main nozzle 28 can be varied and automatically adjusted within predetermined limits by a high speed mixture needle valve 46 threadably received in a passage 48 in the body 26. The free end of the needle valve 46 variably restricts fuel flow past a passage seat 50 which is in flow communication on its upstream side with the metering chamber 30 via a body passage (not shown) and on its downstream side with a second passage 52. The second passage 52 communicates with the main nozzle 28 via a body passage (not shown) leading to a valve chamber 58 in which the solenoid tip 16 is disposed and which is movable by actuation of the solenoid 10 to communicate the valve chamber 58 with the main nozzle 28 through the passage 24 adjacent the seat 22.

The solenoid 10 has a generally cylindrical outer casing 60 received around a solenoid body 62 and enclosing the lower portion of the body 62. The cylindrical permanent magnet armature 20 is received within a cylindrical bore 64 formed in the body 62. A pair of annular cavities 66, 68 defined in part between the body 62 and the casing 60 each receives an annular coil winding 70, 72 of the solenoid 10. A wall 74 of the carburetor body 26 closes the lower end of the solenoid 10. Suitable electrical terminals 76 are received in complementary openings 78 provided in an upper wall 80 of the carburetor body 26. An O-ring 82 may be received around the lower end of the casing 60 adjacent the carburetor body 26 to prevent fuel from leaking between the casing 60 and body 26.

The solenoid tip subassembly 14 is operably connected to the armature 20 by the magnetic attraction between them. The addition of the relatively small disk 18 of a magnetically highly permeable material does not appreciably affect the performance of the solenoid 10. The disk 18 is preferably made of a ferromagnetic material, such as iron, nickel or stainless steel, and has a sufficient magnetic force that the disk 18 does not move relative to the armature 20 even under relatively high acceleration, deceleration and speed of movement of the armature 20 during use of the solenoid 10. The disk 18 may be made of any highly magnetic material including various steel and iron compositions and preferably a stainless steel, such as 430 stainless steel, to prevent rusting or oxidation of the disk 18 in its operating environment of hydrocarbon fuels. The tip 16 is desirably formed of a polymeric material and preferably of an elastomeric material constructed to provide a fluid tight seal when engaged with the valve seat 22. Currently preferred materials for the tip 16 include any non-magnetic material especially elastomers, thermoplastics and thermosets such as DELRIN or acetyl, nylon, silicone, synthetic rubber and various other elastomers and plastics which are highly resistant to deterioration by exposure to hydrocarbon fuels.

In use, an electric current is selectively provided to the terminals 76 of the solenoid 10 to selectively energize the wire coils 70, 72 received in the annular cavities 66, 68. When the coils 70, 72 are relaxed, or not energized, the armature 20 is in a first position within the bore 64 and when the coils 70, 72 are energized, the armature 20 is moved to a second position in the bore 64 by the electromagnetic field generated by the energized coils 70, 72. Subsequently, when the electric current is interrupted, or no longer provided to the coils 70, 72, the armature 20 returns to its first position. Alternatively, a current of one polarity can be supplied to the coils 70, 72 to move the armature 20 to a second position in the bore 64 and a current of an opposite polarity can be supplied to more rapidly return the armature 20 to its first position. By driving the armature 20 to reciprocate in this manner, the solenoid 10 can be used to control the fluid flow through the passage 24 via the tip 16 operably associated with the armature 20 and engageable with the seat 22. Specifically, when the armature 20 is in its first position the tip 16 bears on the seat 22 to close the passage 24 and prevent fluid flow therethrough. When the armature 20 is in its second position the tip 16 is disengaged from the seat 22 to open the passage and permit fluid flow therethrough. If desired, the extent to which the solenoid valve opens may be a function of the magnitude of the current applied to the coils, to vary the rate of flow through the valve.

Figure 4:
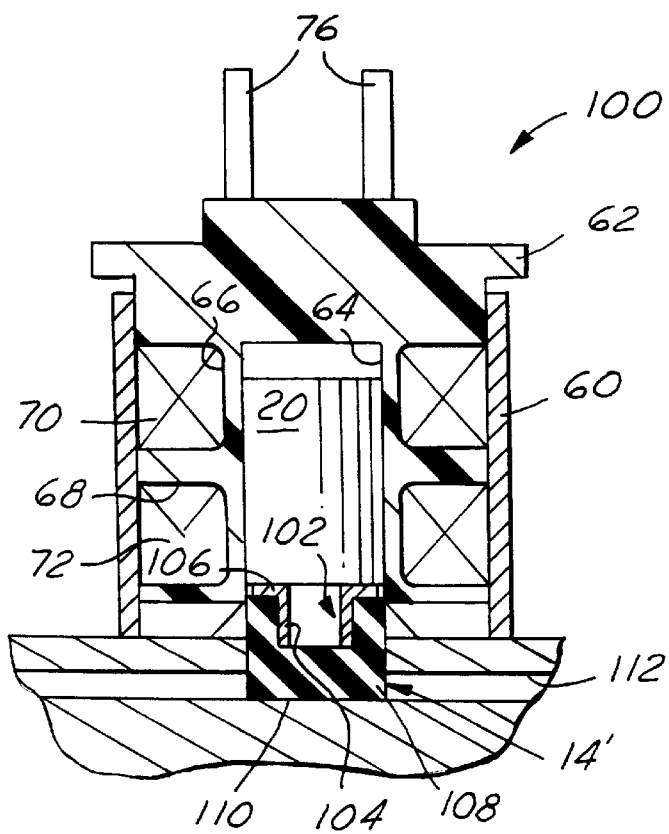
FIG. 4 is a cross sectional view of a second embodiment of a permanent magnet armature solenoid embodying the invention and shown in its closed position.

In a second embodiment of this invention, as shown in FIG. 4, a solenoid 100 has a magnetic insert 102 with a generally cylindrical sidewall 104 and a radially extending flange 106 adjacent the upper end of the sidewall 104 and constructed to engage the armature 20 and remain attached thereto by the magnetic attraction between them. To form the solenoid tip subassembly 14', a modified polymeric tip 108 is preferably molded around the sidewall 104 thereby providing an elongate tip 108 with a distal end 110 axially spaced from the armature 20. This enables the solenoid 100 to be used to control the fluid flow through a passage 112 that is spaced somewhat from the solenoid body 62 while the armature 20 is maintained within the coils in the body 62 to avoid degrading the performance of the permanent magnet armature solenoid 100. The second embodiment solenoid 100 functions in substantially the same way as the first embodiment solenoid 10 and hence its operation will not be described further.

Providing a flexible tip 16, 108 for the solenoid 10, 100 which is molded onto a magnetic disk 18 or insert 102 enables the solenoid tip subassemblies 14, 14' to be manufactured with conventional molding techniques without damaging the armature 20 or creating excessive flash which must be removed. Thus, the solenoid tip subassemblies 14, 14' can be manufactured in large production runs at a relatively low cost. With the insert 102 as shown in the second embodiment of FIG. 4, the tip 108 can be extended to work in a passage 112 axially spaced from the solenoid body 62 while maintaining the armature 20 within the coils 70, 72 in the body 62. The flexible tip 16, 108 ensures a fluid tight seal of the fluid passage 24, 112 and also absorbs the shock or the force when the tip 16, 108 engages with the seat 22 to reduce the tendency of the tip 16, 108 to bounce away from the seat 22 and to prevent damage to the tip 16, 108 and to the seat 22.

I claim:

1. A permanent magnet armature solenoid comprising:

a body;

a cavity formed in the body;

a permanent magnet armature slidably received in the cavity for reciprocation between first and second positions;

an electric coil carried by the body and received generally around the armature;

a separate insert of a magnetically highly permeable material carried by and connected to the armature only by the magnetic attraction between them; and a valve closure tip of a non-magnetic, flexible and elastic polymeric material bonded to the insert, whereby when an electrical current is supplied to energize the coil an electromagnetic field is generated to move the armature from its first position toward its second position and when the coil is not energized, or the polarity of the current supplied to the coil is reversed, the armature returns to its first position and the tip is operably associated with the armature through the insert to reciprocate in unison with the armature.

2. The solenoid of claim 1 wherein the tip is formed of at least one of a nylon, acetyl, silicone, and synthetic rubber polymeric material.

3. The solenoid of claim 1 wherein the tip is molded onto the insert.

4. The solenoid of claim 1 wherein the tip is injection molded onto the insert.

5. The solenoid of claim 2 wherein the tip is formed from at least one of a nylon, acetyl, silicone, and synthetic rubber material.

6. The solenoid of claim 1 wherein the insert is made of steel.

7. The solenoid of claim 1 wherein the insert is made of stainless steel.

8. The solenoid of claim 1 wherein the insert is generally flat and has a pair of opposed faces with one face constructed to engage the armature and the other face receiving the tip thereon.

9. The solenoid of claim 1 wherein the insert has a generally cylindrical sidewall and the tip is at least partially received around the sidewall.

10. The solenoid of claim 9 wherein the insert has a radially extending flange with a generally flat face constructed to engage the armature to increase the surface area of the insert engageable with the armature.

11. The solenoid of claim 1 wherein the distance the armature moves from its first position towards its second position corresponds to the magnitude of the current supplied to the coil.

12. A method of making a permanent magnet armature comprising the steps of:

a) providing a body having a cavity formed therein;

b) providing a permanent magnet armature adapted to be received in the cavity for reciprocation therein;

c) providing a coil carried by the body and received generally around the armature;

d) providing a separate insert of a magnetically highly permeable material;

e) providing a valve closure tip of a non-magnetic, flexible and elastic polymeric material;

f) forming an insert and tip subassembly by bonding the tip to a portion of the insert; and g) placing the insert and tip subassembly onto the armature so that only the magnetic attraction between the insert and the armature firmly holds the insert and tip subassembly on the armature for movement in unison with the armature.

13. The method of claim 12 wherein the tip is formed from at least one of a nylon, acetyl, silicone, and synthetic rubber polymeric material.

14. The method of claim 12 wherein the insert and tip subassembly is formed by molding the tip onto the insert.

15. The method of claim 12 wherein the insert and tip subassembly is formed by injection molding the tip onto the insert.

16. The method of claim 12 wherein the insert is generally flat and has a pair of opposed faces with one face adapted to engage the armature and the other face adapted to receive the tip thereon.

17. The method of claim 12 wherein the insert has a generally cylindrical sidewall and the tip is at least partially received around the sidewall.

18. The method of claim 17 wherein the insert has a radially extending flange with a generally flat face adapted to engage the armature to increase the surface area of the insert engageable with the armature.

19. The method of claim 12 wherein the insert is made of stainless steel.

20. The method of claim 12 wherein the insert is made of steel.

* * * * *